United States Patent
Allen-Ware et al.

(10) Patent No.: US 9,733,692 B2
(45) Date of Patent: *Aug. 15, 2017

(54) MANAGING STORAGE SYSTEM POWER USAGE BY ADJUSTING A FLASH DEVICE ERASURE RATE AND A DATA WRITE RATE FOR STORAGE SUB-UNITS ACCORDING TO A NON-UNIFORM POWER BUDGET

(71) Applicant: International Business Machines Corporation, Armonk, NY (US)

(72) Inventors: Malcolm S. Allen-Ware, Tucson, AZ (US); Shawn P. Authement, Round Rock, TX (US); John C. Elliott, Tucson, AZ (US); Charles R. Lefurgy, Austin, TX (US); J. Carlos A. Pratt, Tucson, AZ (US); Karthick Rajamani, Austin, TX (US); David B. Whitworth, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/364,330

(22) Filed: Nov. 30, 2016

(65) Prior Publication Data
US 2017/0139464 A1 May 18, 2017

Related U.S. Application Data

(63) Continuation of application No. 14/939,111, filed on Nov. 12, 2015.

(51) Int. Cl.
| | |
|---|---|
| *G06F 1/00* | (2006.01) |
| *G06F 1/32* | (2006.01) |
| *G06F 3/06* | (2006.01) |

(52) U.S. Cl.
CPC .......... *G06F 1/3234* (2013.01); *G06F 1/3206* (2013.01); *G06F 3/0625* (2013.01); *G06F 3/0653* (2013.01); *G06F 3/0679* (2013.01)

(58) Field of Classification Search
CPC .... G06F 1/3234; G06F 1/3206; G06F 3/0625; G06F 3/0653; G06F 3/0679
(Continued)

(56) References Cited

U.S. PATENT DOCUMENTS

| | | |
|---|---|---|
| 7,340,616 B2 | 3/2008 | Rothman et al. |
| 7,539,881 B2 | 5/2009 | Shaw et al. |

(Continued)

OTHER PUBLICATIONS

Allen-Ware et al., "Dynamic Power and Thermal Capping for Flash Storage", U.S. Appl. No. 14/236,148, filed May 23, 2014, pp. 1-36.
(Continued)

*Primary Examiner* — Robert Cassity
(74) *Attorney, Agent, or Firm* — Steven F. McDaniel

(57) ABSTRACT

A method includes monitoring power usage for a storage system that includes a set storage units at a first level of storage granularity and a set of storage sub-units at a second level of storage granularity, wherein the second level of storage granularity is finer than the first level of storage granularity. The method further includes assigning a non-uniform power budget to the set of storage units and adjusting a power budget for the storage sub-units according to the non-uniform power budget assigned to the storage units. A corresponding computer program product and computer system are also disclosed herein.

1 Claim, 5 Drawing Sheets

(58) Field of Classification Search
USPC .......................................................... 713/322
See application file for complete search history.

(56) References Cited

U.S. PATENT DOCUMENTS

| | | |
|---|---|---|
| 7,739,461 B2 | 6/2010 | Hur et al. |
| 7,793,126 B2 | 9/2010 | McGrane et al. |
| 8,127,165 B2 | 2/2012 | Qi et al. |
| 8,276,012 B2 | 9/2012 | Hanson et al. |
| 8,429,436 B2 | 4/2013 | Fillingim et al. |
| 8,433,931 B2 | 4/2013 | Burg et al. |
| 8,639,958 B2 | 1/2014 | Belluomini et al. |
| 8,751,836 B1 | 6/2014 | Piszczek et al. |
| 9,454,205 B1 | 9/2016 | Allen-Ware et al. |
| 2005/0080986 A1 | 4/2005 | Park |
| 2008/0117686 A1* | 5/2008 | Yamada ................. G11C 16/30 365/185.21 |
| 2010/0313044 A1 | 12/2010 | Rajpal et al. |
| 2011/0016342 A1* | 1/2011 | Rowan ................ G06F 11/3006 713/340 |
| 2012/0254523 A1 | 10/2012 | Shimada |
| 2012/0324264 A1 | 12/2012 | Hanson et al. |
| 2013/0290611 A1 | 10/2013 | Biederman et al. |
| 2014/0100838 A1 | 4/2014 | Stelmakh |
| 2016/0092116 A1* | 3/2016 | Liu ........................ G11C 5/025 711/103 |

OTHER PUBLICATIONS

IBM et al., "Dynamic Priority Input/Output Operation Mechanism", An IP.com Prior Art Database Technical Disclosure, Original Publication Date: Nov. 1, 1986, Original Disclosure Information: TDB 11-86 p. 2630-2631, IP.com No. IPCOM000062404D, IP.com Electronic Publication: Mar. 9, 2005, 2 pages.

Allen-Ware et al., "Storage System Power Usage", U.S. Appl. No. 14/939,111, filed Nov. 12, 2015, 26 pages.

Allen-Ware et al., "Storage System Power Usage", U.S. Appl. No. 15/364,295, filed Nov. 30, 2016, 23 pages.

IBM Appendix P, list of patents and patent applications treated as related, Nov. 30, 2016, 2 pages.

* cited by examiner

MANAGING STORAGE SYSTEM POWER USAGE BY ADJUSTING A FLASH DEVICE ERASURE RATE AND A DATA WRITE RATE FOR STORAGE SUB-UNITS ACCORDING TO A NON-UNIFORM POWER BUDGET

BACKGROUND OF THE INVENTION

The present invention relates generally to managing power usage and specifically to managing power usage in a storage system.

Without power management, data storage systems can intermittently consume significant levels of power and create power usage spikes and surges within a computing environment such as a data center. For example, date write operations and block erasure operations on flash storage devices consume much higher levels of power (e.g., 10× and 30× respectively) than read operations. In response to the foregoing, a variety of power management approaches have been developed for storage systems. For example, erasure operations associated with "garbage collection" are often throttled within flash storage systems in order to reduce power consumption spikes and surges.

SUMMARY

A method includes monitoring power usage for a storage system that includes a set of storage units at a first level of storage granularity and a set of storage sub-units at a second level of storage granularity, wherein the second level of storage granularity is finer than the first level of storage granularity. The method further includes assigning a non-uniform power budget to the plurality of storage units and adjusting a power budget for the storage sub-units according to the non-uniform power budget assigned to the storage units.

A corresponding computer program product includes one or more computer readable storage media and program instructions stored on the one or more computer readable storage media, the program instructions comprising instructions to monitor power usage for a storage system that includes a set of storage units at a first level of storage granularity and a set of storage sub-units at a second level of storage granularity, wherein the second level of storage granularity is finer than the first level of storage granularity. The program instructions also include instructions to assign a non-uniform power budget to the plurality of storage units and adjust a power budget for the storage sub-units according to the non-uniform power budget assigned to the set of storage units.

A corresponding computer system includes a storage system that includes a set of storage units at a first level of storage granularity and a set of storage sub-units at a second level of storage granularity, wherein the second level of storage granularity is finer than the first level of storage granularity. The computer system also includes one or more computers and the above described computer program product.

DETAILED DESCRIPTION

As mentioned in the background section, flash storage systems often defer or throttle data write and erasure operations to prevent surges in consumed power. However, wholesale deferral or throttling of such operations may adversely affect the performance of a data processing environment. Various embodiments of the present invention that address at least some of the foregoing issues are described hereafter with reference to the Figures.

Figure 1:
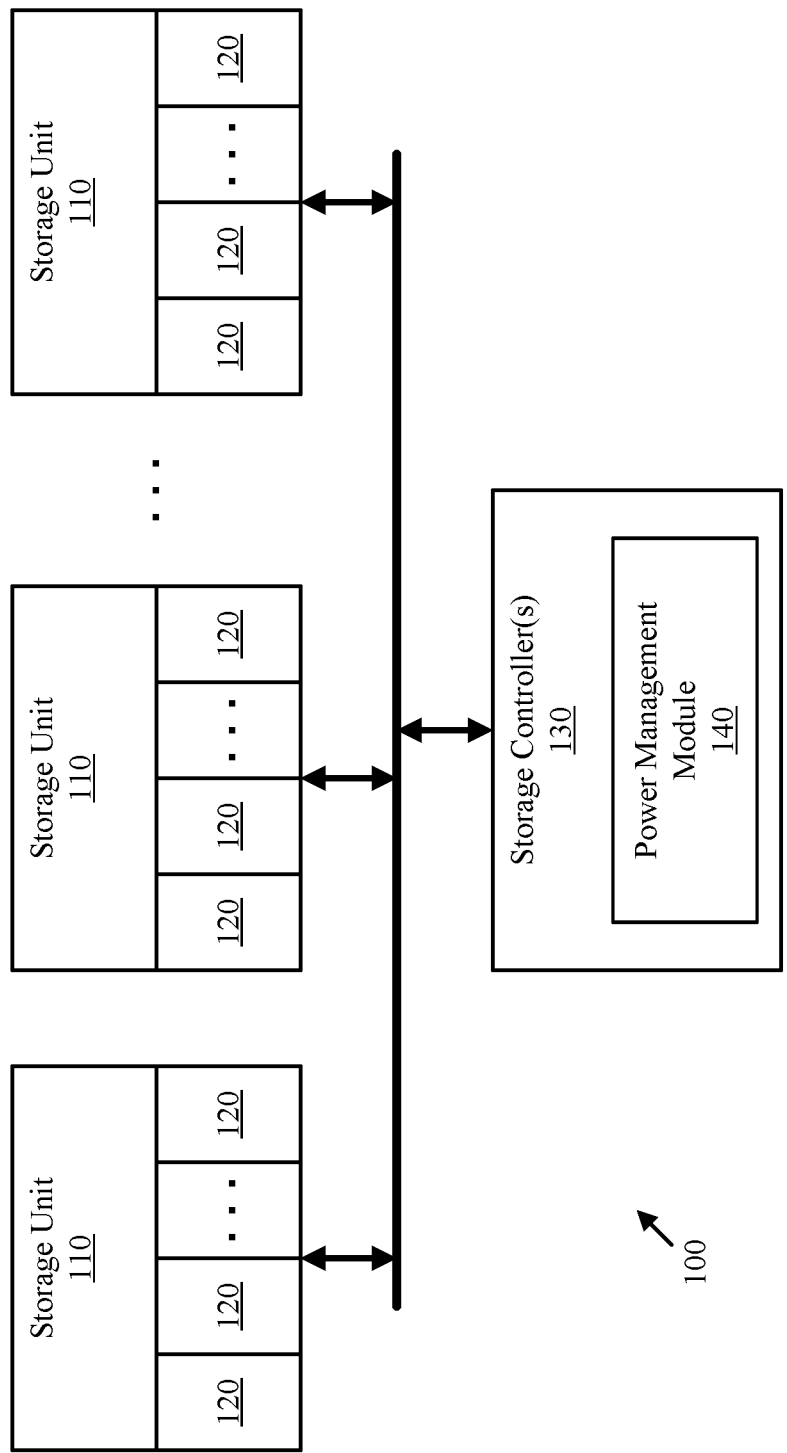
FIG. 1 is functional block diagram of depicting one example of a storage system in accordance with at least one embodiment disclosed herein.

FIG. 1 is functional block diagram of depicting one example of a storage system 100 in accordance with at least one embodiment disclosed herein. As depicted, the storage system 100 includes a set of storage units 110 comprised of storage sub-units 120, one or more storage controllers 130, and a power management module 140. The storage system 100 enables power distribution that is responsive to a variety of factors such as service level agreements, policies, task priorities, and user priorities.

The storage units 110 and the storage sub-units 120 are physical or logical units of storage that store data. In some embodiments, the storage units 110 and/or sub-units 120 are physical units of storage that are housed or packaged in separate physical domains. Examples of such physical domains include sites, data centers, buildings, rooms, cabinets, enclosures, racks, shelfs, cards, devices, drives, circuit boards, and integrated circuits. The storage units 110 and/or sub-units 120 may also be logical units of storage such as RAID groups, volumes (i.e., LUNs), and the like. Whether physical or logical, the storage units 110 and sub-units 120 may comprise various types of storage media including flash memory, dynamic ram, rotational media, and tape media.

The storage controllers 130 control access to the storage units 110 and sub-units 120. The storage controllers 130 may be physically separate from, or integrated into, the storage units 110. For example, in some embodiments the storage system 100 is contained within one or more racks and each storage unit 110 and storage controller 130 corresponds to a physically distinct space (e.g., shelf or piece of equipment) within the racks. Similarly, in some embodiments each storage sub-unit 120 corresponds to a distinct drive (or volume) such as card-based flash drive (or volume).

The power management module 140 manages the power budget for the storage units 110 and sub-units 120. The power management module 140 may be centralized or distributed amongst the components of the storage system 100.

Figure 2:
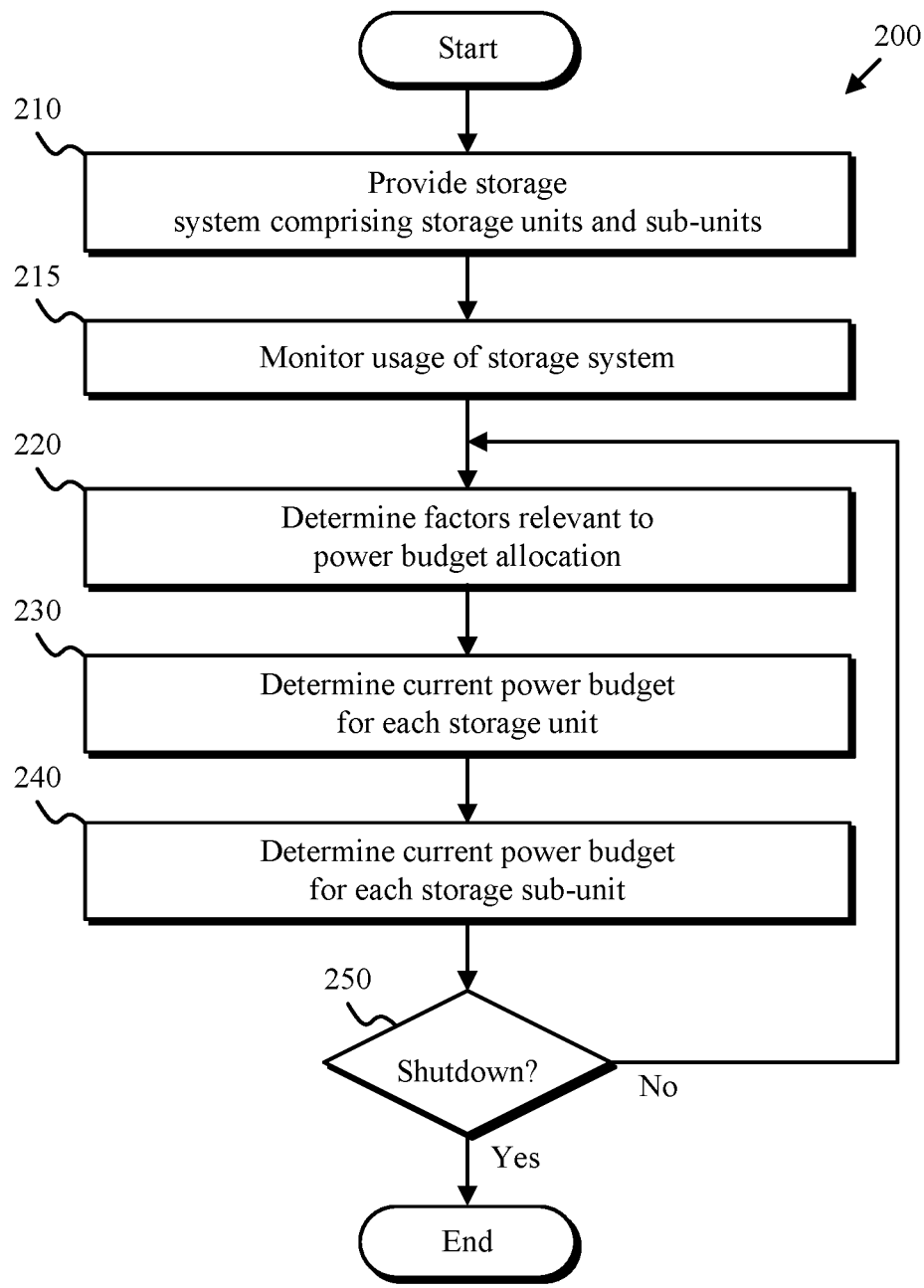
FIG. 2 is flowchart depicting one example of a power distribution method in accordance with at least one embodiment disclosed herein.

FIG. 2 is flowchart depicting one example of a power distribution method 200 in accordance with at least one embodiment disclosed herein. As depicted, the power distribution method 200 includes providing (210) a storage system comprising storage units and sub-units, monitoring (215) usage of the storage system, determining (220) factors relevant to power budget allocation, determining (230) a current power budget for each storage unit, determining (240) a current power budget for each storage sub-unit, and determining (250) whether to continue. The power distribution method 200 may be conducted by the power management module 140 in order to control the distribution of power within a storage system such as the storage system 100.

Providing (210) a storage system comprising storage units and sub-units may include providing a storage system such as the storage system 100 depicted in FIG. 1. The storage system may be hierarchically structured with multiple levels of storage granularity. One level of storage granularity may correspond to (i.e., managed as) storage units while a finer level of storage granularity may correspond to (i.e., managed as) storage sub-units.

Monitoring (215) usage may include monitoring the power usage (i.e., consumption) of each of the storage sub-units as well as the storage system as a whole. In some embodiments, power usage is directly measured (e.g., via in-situ circuitry) while in other embodiments one or more metrics that correlate to power usage, such as erasure rate and/or data access rate, are used to estimate power usage.

Determining (220) factors relevant to power budget allocation may include determining various configuration settings, performance metrics, and policies for a storage system that are relevant to intelligent power budget allocation. Examples of configuration settings and performance metrics include power, throughput, bandwidth, storage topology and storage budget/usage. The configurations settings, performance metrics, and policies may be managed and/or monitored at various levels of storage granularity such as a system level, a service level, a storage unit level, and a storage sub-unit level.

Determining (230) a current power budget for each storage unit may include using the configuration settings, performance metrics, and policies for a storage system to determine a desired power budget for each storage unit in a storage system. The power budget may be different for each storage unit due to the variation in usage, configuration settings, performance metrics, and policies relevant to each storage unit.

Determining (240) a current power budget for each storage sub-unit may include sub-allocating the power budget for a storage unit to the storage sub-units that belong to the storage unit. In some embodiments, the power budget for a storage unit is evenly allocated to the storage sub-units that belong to that storage unit. In other embodiments, the power budget for a storage unit is allocated to the storage sub-units based on configuration settings, performance metrics, and policies for each storage sub-unit.

In some embodiments, the current power budgets for the storage units and/or sub-units are hard limits. Applying those hard limits is referred to herein as power capping. For example, in response to determining a current power budget (i.e., power cap) for a sub-unit the current power usage may be compared with the current power budget. If the current power usage for the sub-unit is above the power cap the sub-unit may be throttled to bring the power usage in line with the power budget. If the current power usage of the sub-unit is below the power cap, throttling may be reduce or eliminated for the sub-unit.

One of skill in the art will appreciate that throttling may be accomplished in a variety of ways. For example, in some embodiments a device erasure rate and data write rate may be limited (i.e., capped) to a level that corresponds to the current power budget. In other embodiments, such rates are dynamically adjusted (relatively) higher and lower in response to and proportional to the difference between the current power usage and the current power budget. In such an embodiment, the power budgets for the sub-units within a storage unit or the system as a whole may be selected to provide a safety margin so that power usage for some sub-units may drift temporally above their power budget while maintaining a (statistical) power cap for the system as a whole.

Determining (250) whether to continue may include determining if a shutdown request or other terminating event has occurred. If a terminating event has not occurred, the method loops to the determining operation 220. Otherwise, the method ends.

Figure 3:
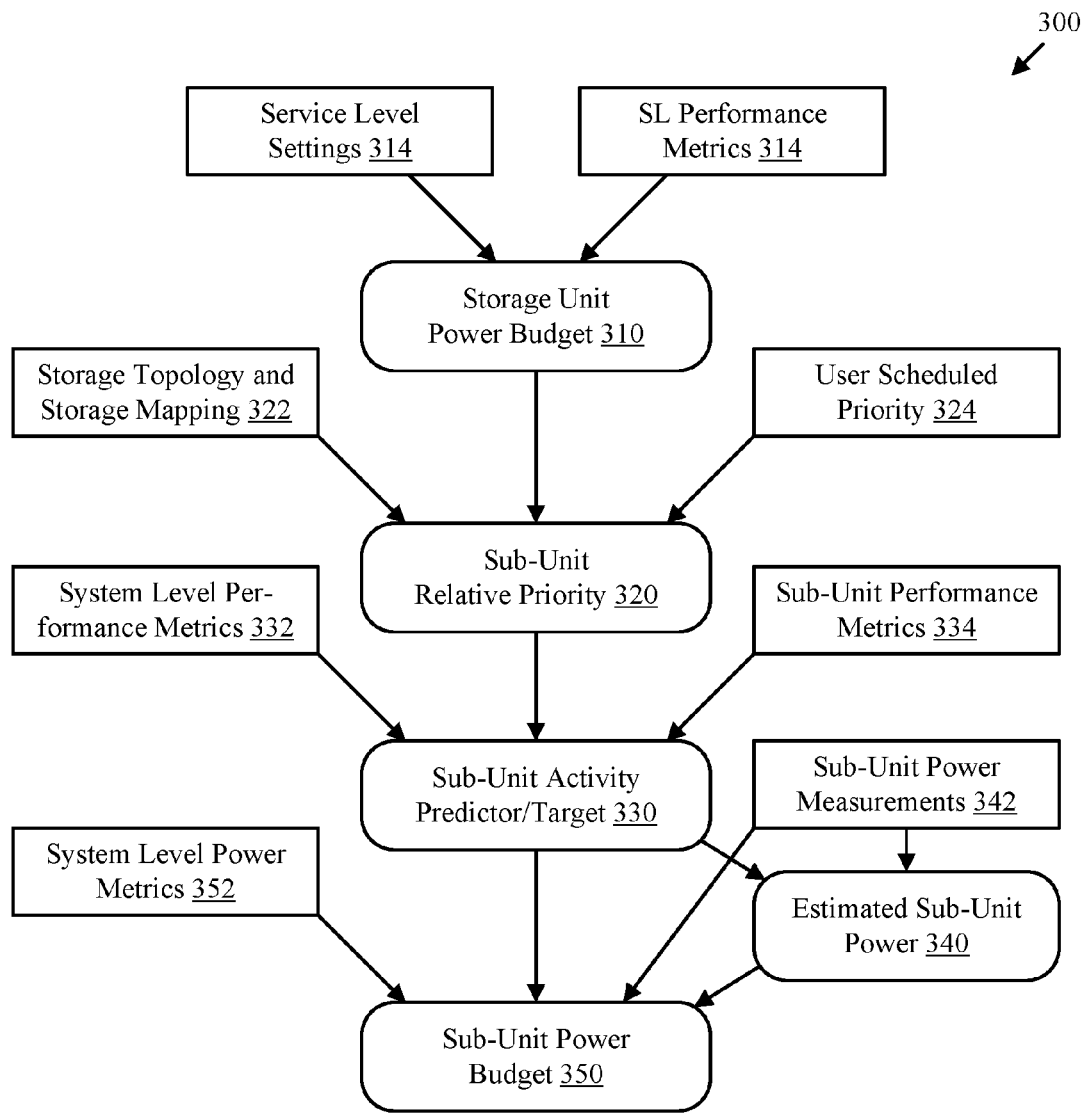
FIG. 3 is a dataflow diagram depicting one example of data interactions related to power allocation in accordance with at least one embodiment disclosed herein.

FIG. 3 is a dataflow diagram 300 depicting one example of data computations related to power allocation in accordance with at least one embodiment disclosed herein. As depicted, the dataflow diagram 300 includes various input parameters (shown in rectangular boxes) and various calculated parameters (shown in rounded boxes). The input parameters and calculated parameters are interconnected in a manner that enables power distribution that is responsive to the various input parameters. While a particular interconnection pattern is shown, one of skill in the art will appreciate that a wide variety of interconnection patterns may be effective in determining power budgets for storage units and sub-units.

In the depicted example, a storage unit power budget 310 (e.g., for each storage unit) is calculated based on service level settings 314 and performance metrics 314. Examples of (guaranteed) service level settings and performance metrics include read operations per second, write operations per second, first byte read latency, and data throughput. The service level settings and performance metric may be selected/determined on a LUN or RAID group basis. Subsequently, a sub-unit relative priority 320 (e.g., for each storage sub-unit) is calculated based on storage topology and mapping settings 322 and user scheduled priority 324.

In the depicted example, a sub-unit activity predictor or target 330 is calculated based on system level performance metrics 332 and sub-unit performance metrics 332. Subsequently an estimated sub-unit power 340 is calculated based on the sub-unit activity predictor or target 330 and one or more sub-unit power measurements 342. Finally, a sub-unit power budget 350 is calculated based on system level power metrics 352, the sub-unit power measurements 342, and the estimated sub-unit power 340.

One of skill in the art will appreciate that the embodiments disclosed herein enable power allocation in a storage system that is dynamically responsive to a wide variety of factors. For example, the embodiments disclosed herein are able to allocate storage unit and sub-unit power budgets that account for policies, assigned service levels, storage demand under changing usage and system capabilities.

Figure 4:
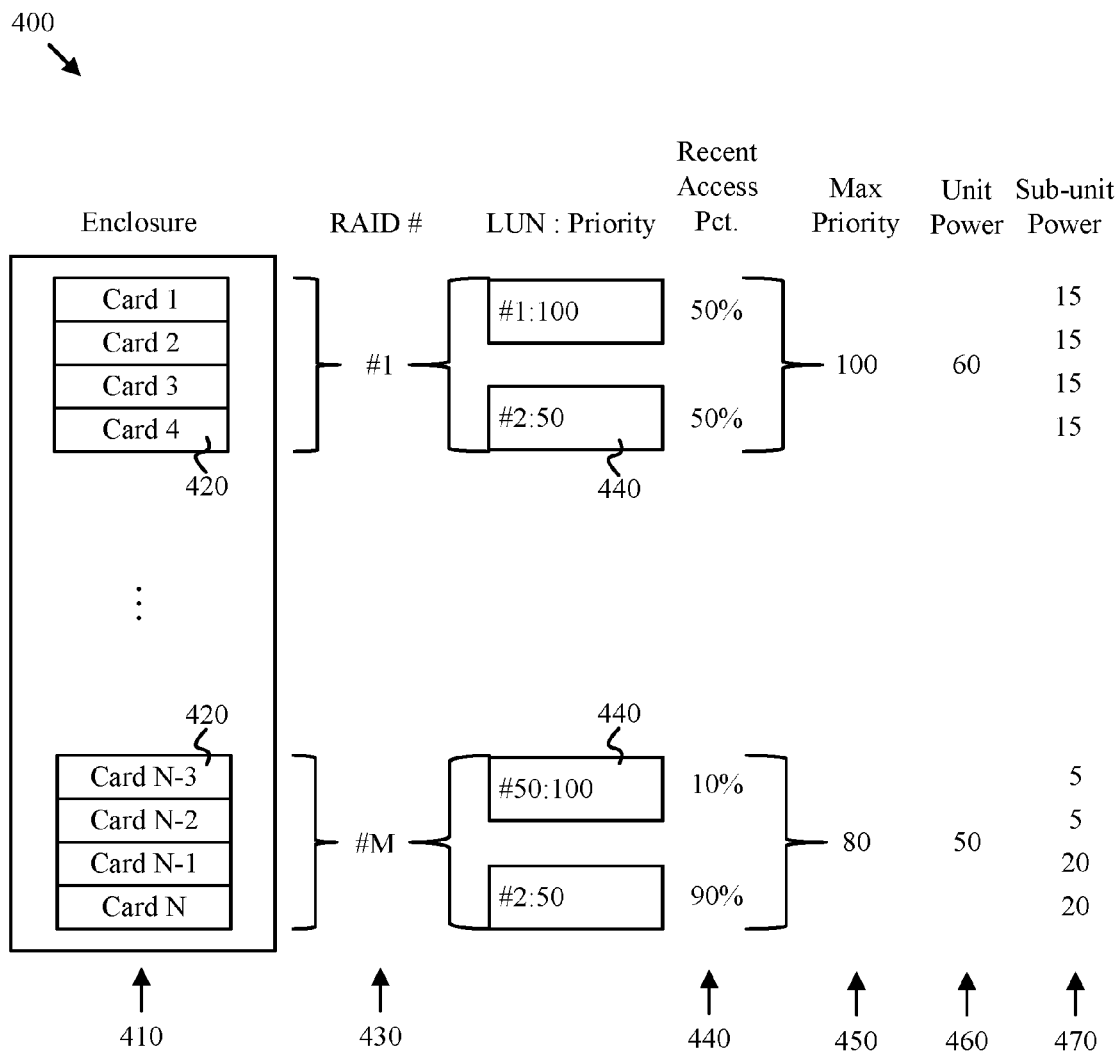
FIG. 4 is a table depicting one example of power budget allocation in accordance with at least one embodiment disclosed herein.

FIG. 4 is a table depicting one example of power budget allocation 400 in accordance with at least one embodiment disclosed herein. As depicted, a raid enclosure 410 comprising an array of card-based flash drives 420 is partitioned into a set of RAID groups 430 that each store one or more volumes (LUNs) 440 thereon. A usage metric 440 and a service level setting 450 are used to calculate a storage unit power budget 460 for each RAID group 430 and storage sub-unit power budget 470 for each flash drive 420. In response to determining the storage sub-unit power budgets 470, the flash drives 420 may throttle data access and/or erasure rates in order to adhere to the allocated power budget. In the depicted embodiment, adherence to the sub-unit power budgets 470 also results in adherence to the storage unit power budgets 460.

Figure 5:
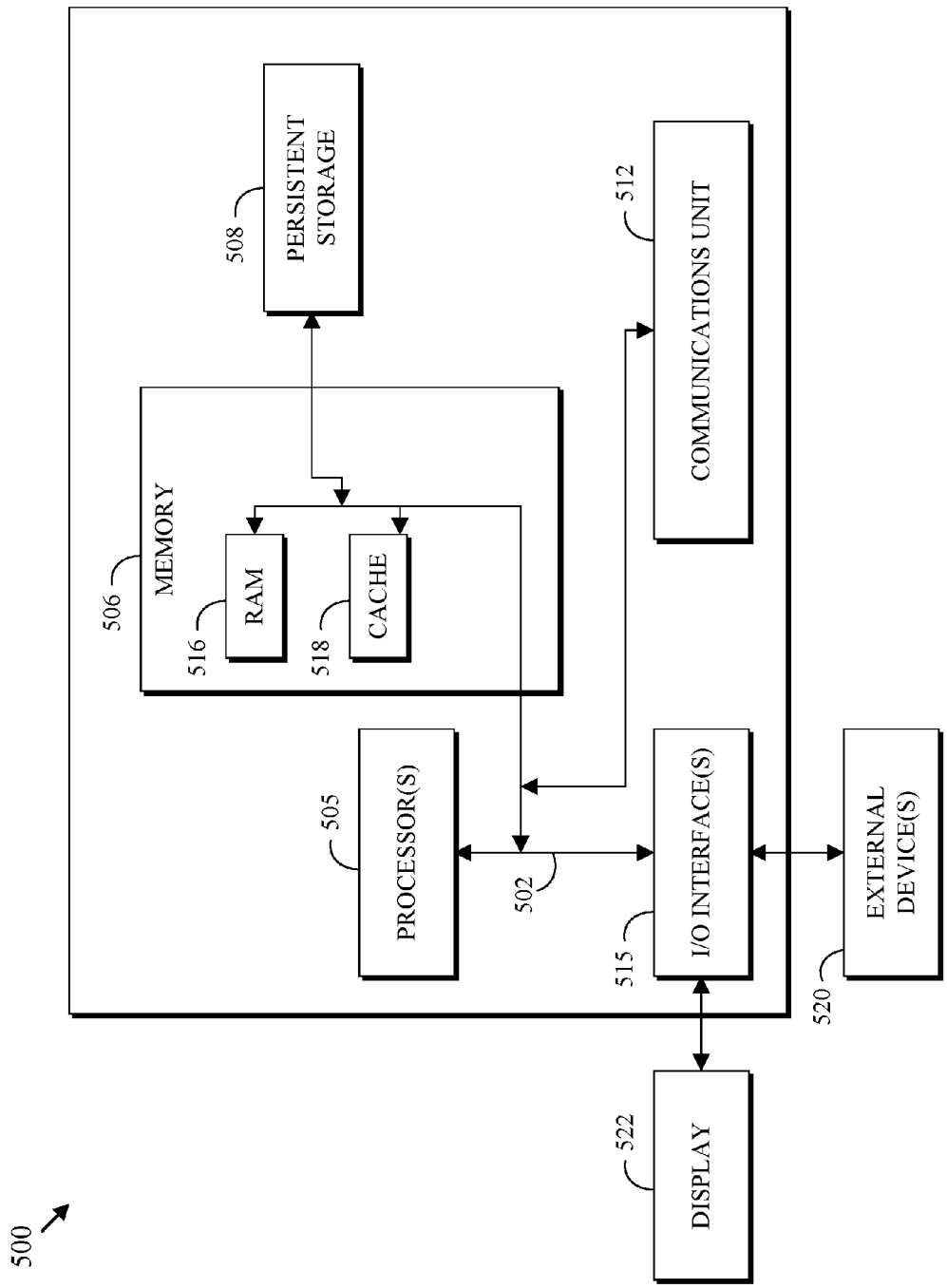
FIG. 5 is a block diagram depicting one example of a computing apparatus (e.g., computer) suitable for executing the methods disclosed herein.

FIG. 5 is a block diagram depicting one example of a computing apparatus (e.g., computer) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer system comprising:
   one or more processors;
   at least one computer-readable storage medium that is not a transitory signal per se and program instructions stored on the at least one computer-readable storage medium, the program instructions comprising instructions to execute a method comprising:
   monitoring, with one or more processors, power usage for a storage system comprising a plurality of storage units at a first level of storage granularity, each storage unit thereof comprising a plurality of storage sub-units at a second level of storage granularity, wherein the second level of storage granularity is finer than the first level of storage granularity;
   assigning, with one or more processors, a non-uniform power budget to the plurality of storage units;
   wherein the non-uniform power budget reflects a power related policy or service level;
   assigning, with one or more processors, a substantially uniform power budget to the storage sub-units that belong to each storage unit; and
   adjusting, with one or more processors, a flash device erasure rate and a data write rate for the plurality of storage sub-units according to the non-uniform power budget assigned to the plurality of storage units and the substantially uniform power budget assigned to the storage sub-units that belong to each storage unit.

\* \* \* \* \*